United States Patent
Abali et al.

(10) Patent No.: US 12,504,897 B2
(45) Date of Patent: Dec. 23, 2025

(54) USING AN ENSEMBLE OF DATA TRANSFORMERS TO ENCODE DATA BEFORE ZERO-VALUE COMPRESSION

(71) Applicant: INTERNATIONAL BUSINESS MACHINES CORPORATION, Armonk, NY (US)

(72) Inventors: Bulent Abali, Tenafly, NJ (US); Alper Buyuktosunoglu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 18/442,702

(22) Filed: Feb. 15, 2024

(65) Prior Publication Data

US 2025/0265002 A1    Aug. 21, 2025

(51) Int. Cl.
*H03M 7/00* (2006.01)
*G06F 3/06* (2006.01)
*H03M 7/30* (2006.01)

(52) U.S. Cl.
CPC .......... *G06F 3/0626* (2013.01); *G06F 3/0644* (2013.01); *G06F 3/0683* (2013.01); *H03M 7/00* (2013.01); *H03M 7/3059* (2013.01)

(58) Field of Classification Search
CPC ...... G06F 3/0644; G06F 3/0683; G06F 17/30; H03M 7/00; H03M 7/3059; H03M 7/3093
USPC ........................................ 341/50, 55, 59, 95
See application file for complete search history.

(56) References Cited

U.S. PATENT DOCUMENTS

| | | | |
|---|---|---|---|
| 6,408,421 B1 | 6/2002 | Benes et al. | |
| 6,775,414 B1 | 8/2004 | Fogg et al. | |
| 6,865,668 B1 | 3/2005 | Benes et al. | |
| 11,080,611 B2 | 8/2021 | Singh | |
| 11,113,784 B2 | 9/2021 | Ray | |
| 11,249,761 B2 | 2/2022 | Baum | |
| 11,763,183 B2 | 9/2023 | Singh | |
| 2004/0177304 A1 | 9/2004 | Mathew et al. | |
| 2009/0307250 A1* | 12/2009 | Koifman | G06F 21/62 |
| 2010/0208826 A1 | 8/2010 | Fogg et al. | |
| 2012/0151224 A1* | 6/2012 | Koifman | H04L 69/04 713/193 |

(Continued)

OTHER PUBLICATIONS

"Drive High Throughput and Low Latency with Next-Generation Network-Optimized Processors," Intel Corporation, Jan. 2023, 5 pp.

(Continued)

*Primary Examiner* — Peguy Jean Pierre
(74) *Attorney, Agent, or Firm* — Konrad, Raynes, Davda & Victor LLP; David Victor

(57) ABSTRACT

Provided are a compression unit, a cache memory, and method for using an ensemble of data transformers to encode data before zero-value compression. A plurality of data transformers that each perform a transform on an input chunk to produce a transformed chunk having more zeroes than the input chunk. A selection unit selects a transformed chunk having a minimum number of non-zero bits. A zero-value compressor processes the selected transformed chunk to output a compressed chunk having all non-zeroes and fewer bits than the input chunk. The compressed chunk is stored in the cache memory cell array.

20 Claims, 7 Drawing Sheets

(56) References Cited

U.S. PATENT DOCUMENTS

2021/0373993 A1\* 12/2021 Sharon ............... G11C 16/0483

OTHER PUBLICATIONS

"Method and System to Accelerate Development of HW/SW that Uses in Storage System with Compression," IP.com, IP.com No. IPCOM000254946D, Aug. 15, 2018, 3 pp.

"Partial Chip access with Data Compression for Energy Saving and Performance Improvement," IP.com, IP.com No. IPCOM000266717D, Aug. 12, 2021, 16 pp.

A. Diwan, et al., "Transfer of Robus Header Compression (ROHC) Contexts to Reduce Decompression Losses", IP.com, IP.com No. IPCOM000138432D, Jul. 18, 2006, 6 pp.

A. Ghasemazar, et al., "Thesaurus: Efficient Cache Compression via Dynamic Clustering," ACM, Proceedings of the 25th Int'l Conf. on Architectural Support for Programming Languages and Operating Systems (ASPLOS 2020) 2020, 14 pp.

A.R. Alameldeen, et al., "Adaptive Cache Compression for High-Performance Processors," IEEE, Proceedings of the 31st Annual International Symposium on Computer Architecture (ISCA'04), 2004, 12 pp.

D.R. Carvalho, et al., "Understanding Cache Compression," ACM Transactions on Architecture and Code Optimization, vol. 18, No. 3, Article 36, Jun. 2021, 27 pp.

F. Knorr, et al., "ndzip: A High-Throughput Parallel Lossless Compressor for Scientific Data," IEEE, 2021 Data Compression Conference (DCC), 2021, 10 pp.

G. Pekhimenko, et al., "Base-Delta-Immediate Compression: Practical Data Compression for On-Chip Caches," ACM, Pact '12, Sep. 19-23, 2012, 12 pp.

J. Fang, et al., "An Efficient High-Throughput LZ77-Based Decompressor in Reconfigurable Logic," Journal of Signal Processing Systems, 2020, 17 pp.

L. Villa, et al., "Dynamic Zero Compression for Cache Energy Reduction," 33rd International Symposium on Microarchitecture, Dec. 2000, 7 pp.

S. Hong, et al., "Touche: Towards Ideal and Efficient Cache Compression by Mitigating Tag Area Overheads," arXiv:1909.00553v1, Sep. 2, 2019, 14 pp.

T. Benes, et al., "High Throughput and Low Latency LZ4 Compressor on Fpga," IEEE, 2019, 5 pp.

U.S. Appl. No. 18/442,669, filed Feb. 15, 2024.

List of Patents or Patent Applications Treated as Related, 2 pp., filed herewith.

United States Non-Final Rejection dated Aug. 5, 2025, 22 pages, in U.S. Appl. No. 18/442,669.

\* cited by examiner

USING AN ENSEMBLE OF DATA TRANSFORMERS TO ENCODE DATA BEFORE ZERO-VALUE COMPRESSION

BACKGROUND OF THE INVENTION

1. Field of the Invention

The present invention relates to a compression unit, a cache memory, and method for using an ensemble of data transformers to encode data before zero-value compression.

2. Description of the Related Art

Data compression may be used to compress cache lines of data to increase the storage capability of a data cache without having to necessarily increase the size of the cache. Many of the bits in a cache line may comprise zero-values. A zero-value compression technique compresses data by removing zero-value bytes from the data to cache, leaving only non-zero values to store in the cache line. In zero-value compression, the non-zero-values may be packed to the left bytes of the word and a bitmask may be prepended to the packed non-zero-values. Decompression involves using the non-zero bitmask to reconstruct the compressed data by placing the non-zero-values in their indicated byte positions in the data and zero-values in their indicated byte positions.

SUMMARY

Provided are a compression unit, a cache memory, and method for using an ensemble of data transformers to encode data before zero-value compression. A plurality of data transformers that each perform a transform on an input chunk to produce a transformed chunk having more zeroes than the input chunk. A selection unit selects a transformed chunk having a minimum number of non-zero bits. A zero-value compressor processes the selected transformed chunk to output a compressed chunk having all non-zeroes and fewer bits than the input chunk. The compressed chunk is stored in the cache memory cell array.

DETAILED DESCRIPTION

Described embodiments improve compression technology to compress data being written to a cache memory. Described embodiments first subject a chunk of data to compress, such as a word of a cache line, to transformation/encoding by an ensemble of data transformers using different data transform operations to encode the data with a greater number of zeros. To optimize the zero-value compression, the transformed chunk is selected from the data transformer that encodes the chunk with the minimum number of non-zero values. By selecting the transformed chunk having the minimum number of non-zero bits or the greatest number of zero bits, the zero-value compression is optimized to remove the maximum number of zero bits by selecting the transformed chunk having the greatest number of zero bits.

Described embodiments optimize the zero-value compression by using an ensemble of data transformers because the number of non-zero values the ensemble of data transformers produce varies depending on the content of different data chunks. In this way, described embodiments select the optimal transformer for the specific data chunk, which may vary from chunk-to-chunk in the cache line to encode, that encodes the greatest number of zeros in the data chunk before subjecting the transformed chunk to zero-value compression.

Described embodiments provide a high throughput, low latency data compressor/decompressor hardware to compress cache lines, such as 256-byte cache lines (64 to 128 bytes in other processors). Described embodiments implement the compression and decompression in the cache memory controller to implement in a small area with high throughput. Certain embodiments provide an ensemble of small special purpose data transformers and zero-value compressors that compete in a tournament to provide the smallest output.

Figure 1:
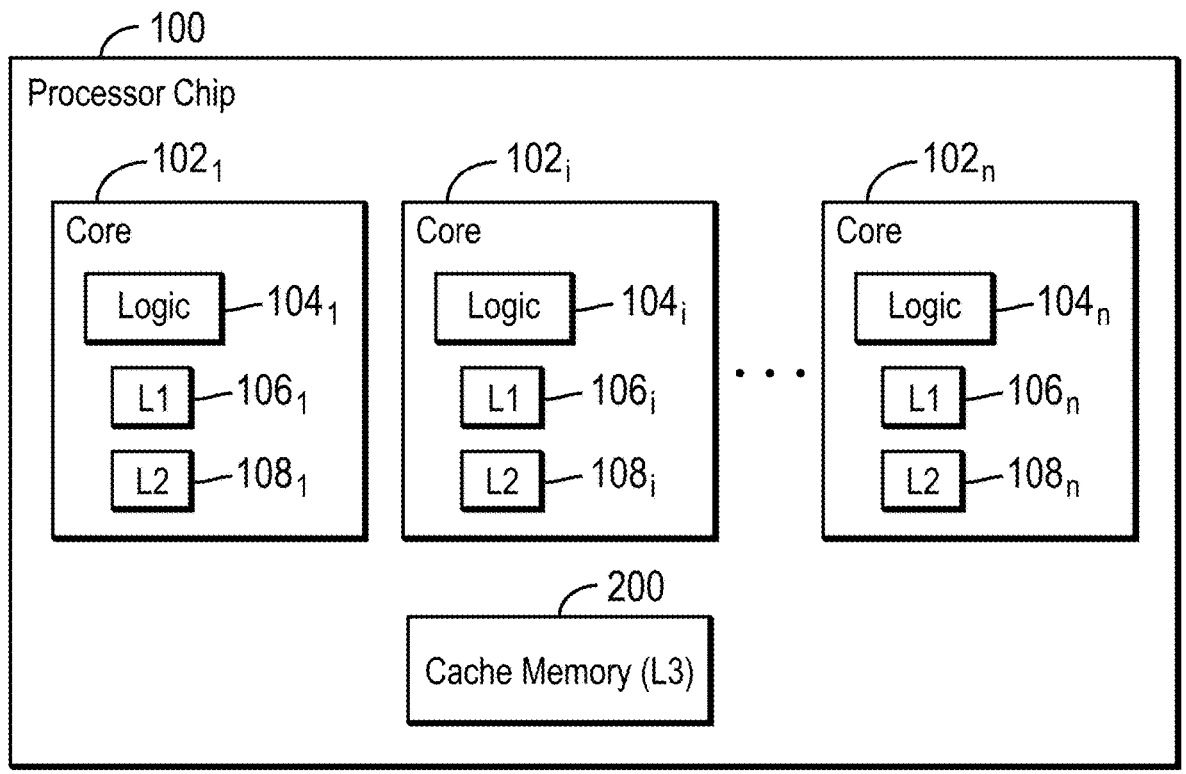
FIG. 1 illustrates an embodiment of a processor chip including multi-level caches.

FIG. 1 illustrates an embodiment of a processor chip 100, in which embodiments may be implemented, including a plurality of processing cores $102_1, 102_i \ldots 102_n$. Each core $102_1, 102_i \ldots 102_n$ has control logic $104_1, 104_i \ldots 104_n$, including core processing functions, such as Arithmetic Logic Units (ALUs) and a memory management unit, and an on-chip L1 cache $106_1, 106_i \ldots 106_n$ and on-chip L2 cache $108_1, 108_i \ldots 108_n$ that are private to the processing cores $102_1, 102_i \ldots 102_n$. The processor chip 100 further includes a last level cache (LLC) 200, also known as an L3 cache, providing a larger storage space to cache data for the L1 and L2 caches in the different cores $102_i$. There may be further levels of caches, such as an intermediate or L4 to cache data for the L3 cache 200. The L3 cache 200 may comprise Dynamic Random Access Memory (DRAM) devices. The processing cores $102_1, 102_i \ldots 102_n$ may write-back modified cache lines from the L2 cache $108_1, 108_i \ldots 108_n$ to the shared last level cache (LLC) 200, shared among the cores $102_1, 102_i \ldots 102_n$, to make room for a cache line evicted from the L1 cache $106_1, 106_i \ldots 106_n$. When modified data needs to be removed from the L2 $108_1, 108_i \ldots 108_n$ to make room for modified data from the L1 cache $106_1, 106_i \ldots 106_n$. a write-back operation is performed to write the data to the last level cache 200.

Figure 2:
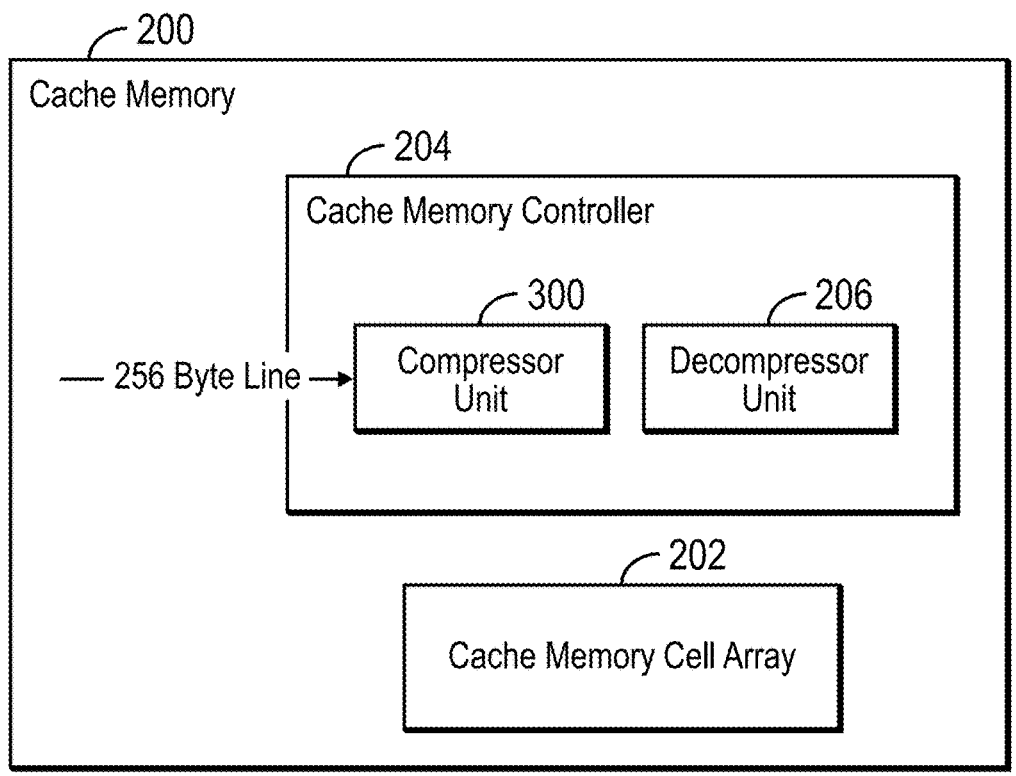
FIG. 2 illustrates an embodiment of a cache memory in the multi-level caches.

With respect to FIG. 2, the L3 cache 200, also referred to as a cache memory, receives cache lines from the L2 cache $106_1, 106_i \ldots 106_n$ to write to a cache memory cell array 202 of cache lines, such as a 256 byte cache line. The cache memory 200 includes a cache memory controller 204 to manage reading and writing data to the cache memory cell array 202, and includes a compressor unit 300 having circuitry to compress received lines of cache to allow the cache 200 to maximize the data that can be stored. A decompressor unit 206 decompresses the compressed data written to the cache memory cell array 202. The cache memory 200 may be implemented in other caching systems than a processor chip 100 of processing cores.

The cache memory 200 may comprise a high-speed data storage layer which stores a subset of data, typically transient in nature, so that future requests for that data are served up faster than is possible by accessing the primary storage location of the data. The cache memory 200 may comprise a volatile or non-volatile memory device, such as a Static Random Access Memory (SRAM), Dynamic Random Access Memory (DRAM), eDRAM (embedded DRAM). Other embodiments may utilize phase change memory (PCM), Magnetoresistive random-access memory (MRAM), Spin Transfer Torque (STT)-MRAM, a ferroelectric random-access memory (Efram), nanowire-based non-volatile memory, and Direct In-Line Memory Modules (DIMMs), NAND storage, e.g., flash memory, Solid State Drive (SSD) storage, non-volatile RAM, etc.

The cache memory controller 204 may be implemented in circuitry in a semiconductor device, such as a Application Specific Integrated Circuit (ASIC), Field Programmable Gate Array (FPGA) in the cache memory controller 204.

Figure 3:
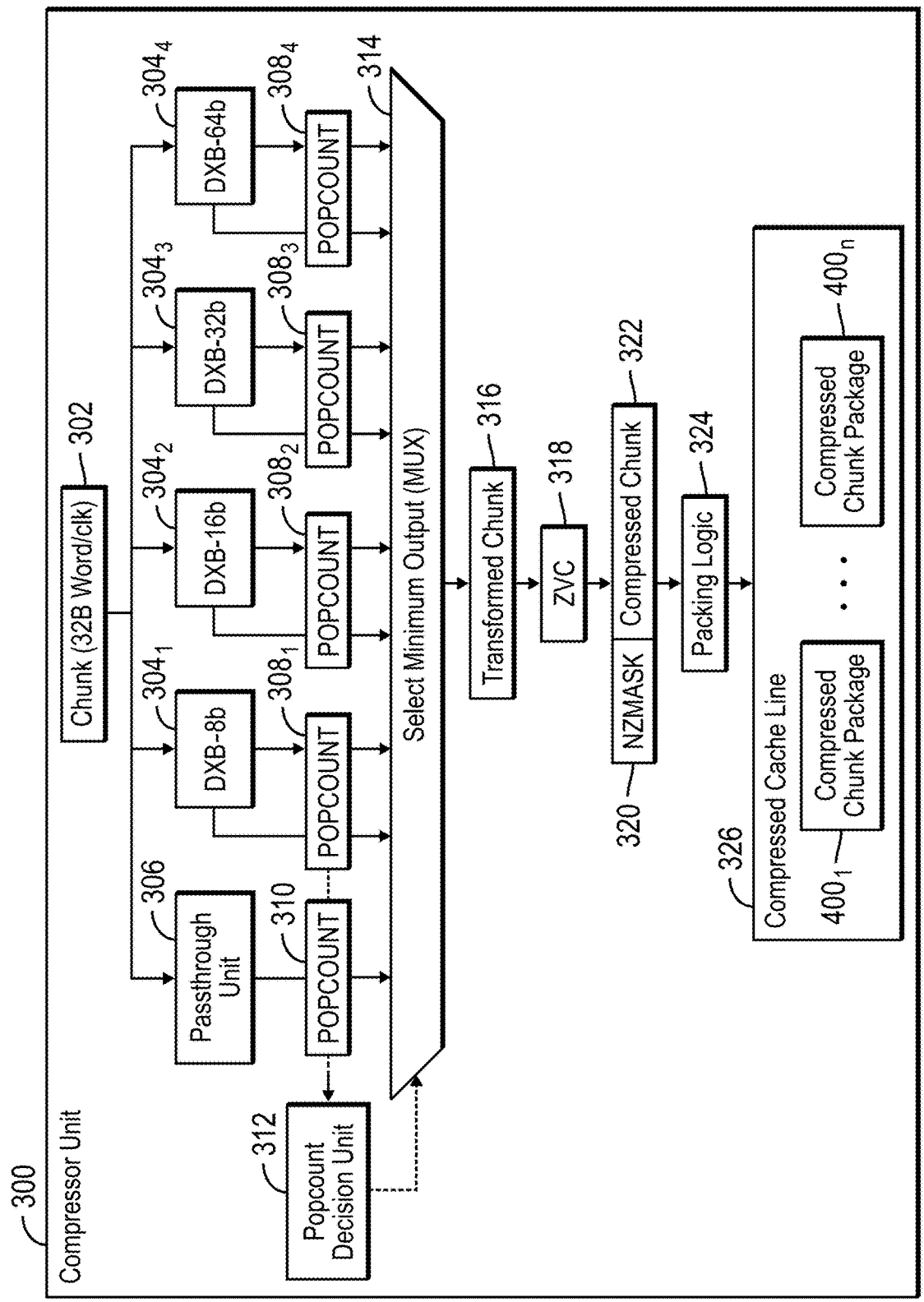
FIG. 3 illustrates an embodiment of a compressor unit implemented in the cache memory.

FIG. 3 illustrates an embodiment of the compressor unit 300 that processes chunks 302 or different words of a cache line, such as eight 32 byte words of a 256 byte cache line. The compressor unit 300 is comprised of data transformers $304_1$, $304_2$, $304_3$, $304_4$, including circuitry to perform different data transforms on the input chunk 302, and one passthrough unit 306 having circuitry to output the received input word 302 without any transformation. Data transformers $304_i$ encode data units of the chunk 302 to increase the number of zeroes in the transformed data units. The data units of the chunk 302 may comprise a bit or one or more bytes. The different data transformers $304_i$ may implement different transform methods or comprise the same method but with different parameters and tuning. For instance, the different data transformers $304_i$ may use the same transform method but process different item size data units of the input chunk 302. For instance, as shown in FIG. 3, the different item size of the data units processed by the data transformers $304_i$ include 8 bytes, 16 bytes, 32 bytes, and 64 bytes.

In one embodiment, the data transformers $304_1$, $304_2$, $304_3$, $304_4$ each implement a combination of a delta, XOR, and bit plane transform, or "DXB". The delta transform may subtract item size bytes in the input word 302 by subtracting all from a single base value or subtracting neighbor values. The XOR transform may XOR the delta transformed bytes, and the bit plane operation may then perform a bit plane transform on the data. In certain embodiments, the difference in the DXB transformers $304_i$ is that they each operate on different data unit sizes, e.g., 8, 16, 32, 64 bytes, of the input chunk 302. In alternative embodiments, different data transforms may be used, and a data transformer $304_i$ may perform only one data transform or a different number and/or type of data transform than the DXB transform combination. The data transformation may involve delta and two-dimensional encoding. In the delta encoding, neighboring data items are subtracted from one another. In two-dimensional encoding, the encoding is performed both vertically (bit-plane) and horizontally (word-plane) and the best of the two dimensions producing the greatest number of zeroes is selected.

The data transformers $304_1$, $304_2$, $304_3$, $304_4$ implement arithmetic/logic operations to transform the data units of the input chunk 302 to a transformed chunk encoded with more zeroes than the input chunk 302. The different transform units $304_1$, $304_2$, $304_3$, $304_4$ may compete in a tournament so the transformed data is selected that results in the minimum number of non-zero-bits.

Each population count unit $308_1$, $308_2$, $308_3$, $308_4$ comprises circuitry coupled to each data transformer $304_1$, $304_2$, $304_3$, $304_4$ and a population count ("POPCOUNT") unit 310 is coupled to the passthrough unit 306. The population count units $308_1$, $308_2$, $308_3$, $308_4$ and 310 count the number of non-zero (NZ) bits in the output from the data transformers $304_1$, $304_2$, $304_3$, $304_4$ and the passthrough unit 306, respectively. The non-zero bits from the population count units $308_1$, $308_2$, $308_3$, $308_4$, and 310 are inputted to a population count (POPCOUNT) decision unit 312, comprising circuitry, that indicates the data transformer $304_1$, $304_2$, $304_3$, $304_4$ or passthrough unit 306 outputting the transformed chunk having a fewest number of non-zero bits. This indication of the data transformer $304_i$ or passthrough unit 306 producing the fewest number of non-zero bits is provided as input to the select minimum output MUX 314, which outputs the transformed chunk 316, having the same byte size as the input word 302, but encoded with a greater number of zeros.

Figure 4:
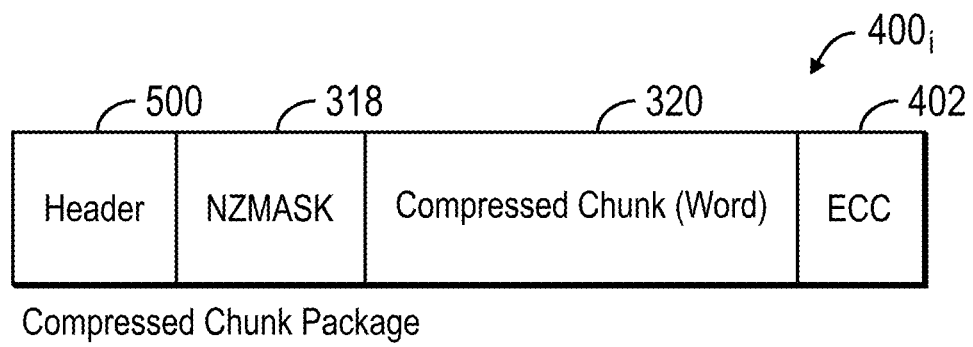
FIG. 4 illustrates an embodiment of a compressed chunk package.

The zero-value compressor 318 compresses the transformed chunk 316, or input chunk 302, to produce the compressed chunk 322 and a non-zero mask (NZMASK) 320 having bits indicating the non-zero values in the transformed chunk 316. Packing logic 324 creates a compressed chunk package 400, as shown in FIG. 4, including a header 500 having metadata on the compressed chunk 322, the non-zero mask (NZMASK) 320, the compressed word 322, and an error correction code (ECC) 402 calculated from an XOR operation on the header 500, NZMASK 320, and compressed word 322. The packing logic 324 may generate a compressed chunk package $400_i$ for each of the n input words 302 processed for a cache line and store all the compressed chunk packages for the cache line in the cache memory cell array 202 to form a compressed cache line 326.

Figure 5:
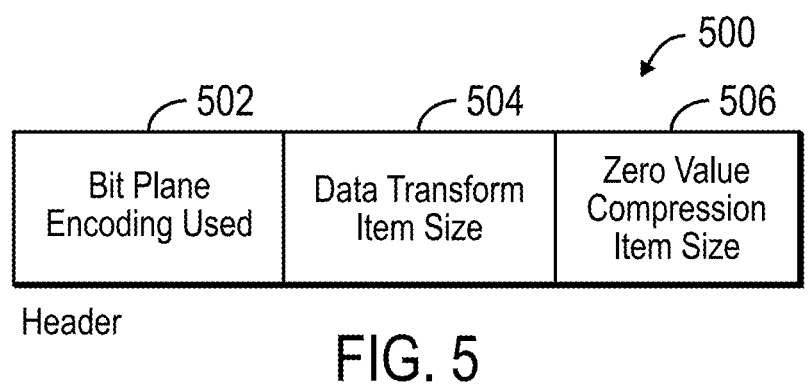
FIG. 5 illustrates an embodiment of a header generated for a compressed chunk.

FIG. 5 illustrates an embodiment of the header 500 in the compressed chunk package $400_i$, and includes a bit plane encoding used flag 502 indicating whether the selected data transformer $304_i$ that outputs the data having the minimum number of non-zero bits performs a bit plane encoding transform; a data transform item size 504 indicating an item size of the data units the data transformer $304_i$ transforms in the input data chunk 302; and a zero-value compression item size 506 indicating a size of the data units in the transformed chunk 316 the zero-value compressor 318 processes to remove data units having a zero value, such as a number of bits or bytes having a zero value.

Figure 6:
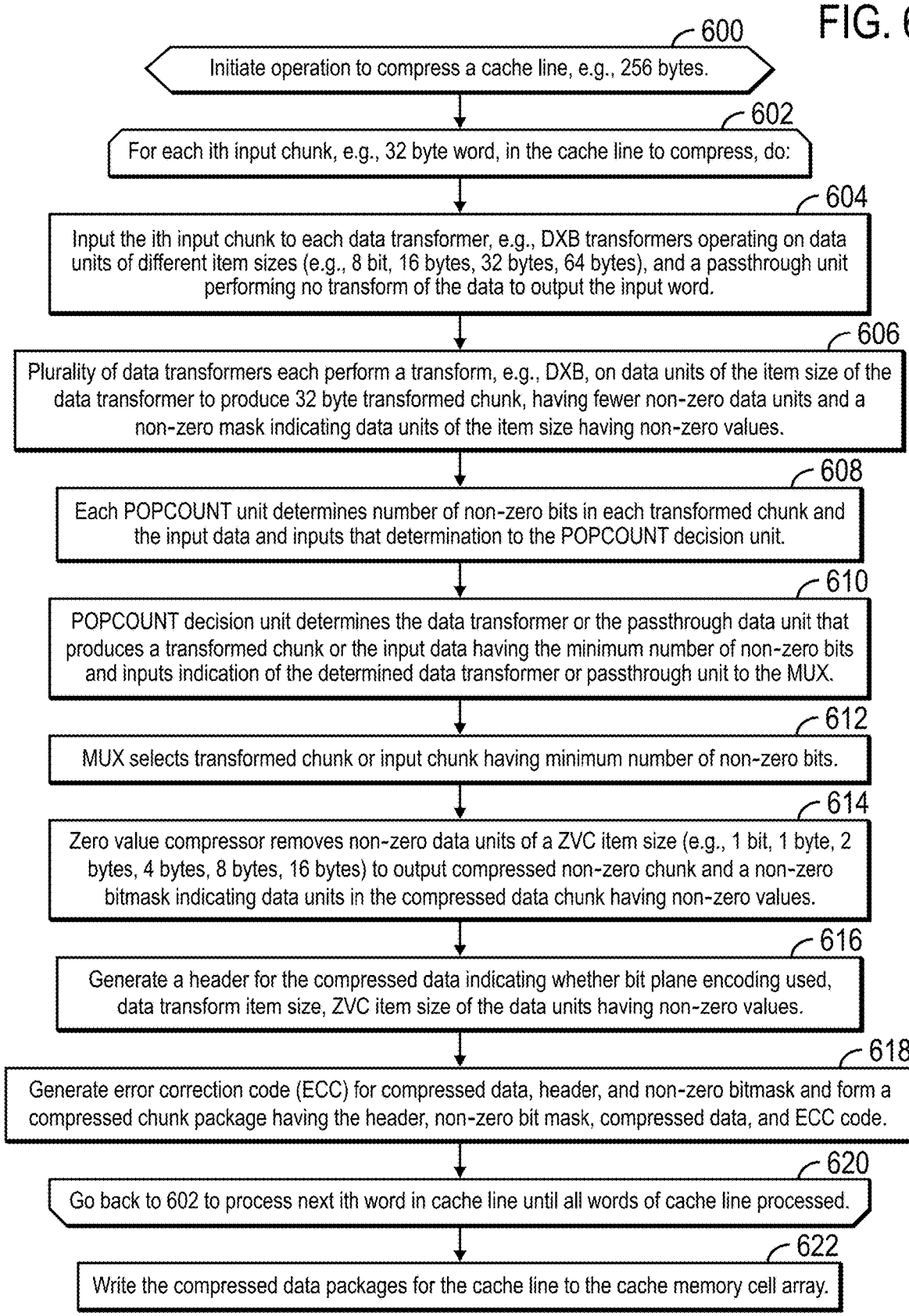
FIG. 6 illustrates an embodiment of operations performed by the compressor unit to compress data for a cache line to store in the cache.

FIG. 6 illustrates an embodiment of operations performed by the compressor unit 300 to compress an input data chunk 302, such as a word, of a cache line to store in the cache memory 200. Upon receiving (at block 600) a cache line to compress, the compressor unit 300 performs a loop of operations 602 through 622 for each input data chunk 302, e.g., 32 byte word, of the cache line to compress. The input data chunk 302 may comprise a word or other sized data unit. The input chunk 302 is inputted (at block 604) to each of the data transformers $304_1$, $304_2$, $304_3$, $304_4$ and the passthrough unit 306. Each data transformer $304_i$ performs (at block 606) a different data transform on the input chunk 302. In one embodiment, the data transformers $304_i$ may perform the same type of transform, e.g., DXB, but perform the transform on different item size data units of the input word 302. The data transformer $304_i$ may increase the number of zeroes in the input chunk 302. Each POPCOUNT unit $308_i$ and 310, coupled to one of the data transformers $304_i$ and passthrough unit 306, determines (at block 608), for the transformed chunk, the number of non-zero bits in the transformed chunk or the input chunk 302 from the passthrough unit 306.

The POPCOUNT decision unit 312 determines (at block 610) the data transformer $304_i$ or the passthrough unit 306 that produces a transformed chunk or input data having the minimum number of non-zero bits and inputs to the MUX 314 indication of the transformer $304_i$ or passthrough unit 306 producing the minimum number of non-zero bits. The MUX 314 selects (at block 612) the transformed chunk 316 or input chunk 302 having the minimum number of non-zero bits to output as the transformed chunk 316 to the zero-value compressor 318. The zero-value compressor 318 removes (at block 614) non-zero data units of a ZVC item size (e.g., 1 bit, 1 byte, 2 bytes, 4 bytes, 8 bytes, 16 bytes) to output the compressed chunk 322 and a non-zero bitmask (NZMASK) 320 indicating data units in the transformed chunk 316 having non-zero values.

Packing logic 324 generates (at block 616) a header 500 for the compressed chunk 322 indicating whether bit plane encoding was used 502 in the data transform, data transform item size 504 of data units in the input chunk 302 transformed, and the zero-value compression item size 506. The ZVC item size 506 may be provided for embodiments using an ensemble of zero-value compressors as described with respect to FIGS. 7, 8, and 9, indicating an item size of the data unit subject to removal if the data unit has a non-zero value. The packing logic 324 further generates (at block 618) an error correction code (ECC) 402 for the compressed chunk 322, header 500, and non-zero bitmask 320 and forms a compressed chunk package $400_i$ having the header 500, non-zero bit mask 320, compressed chunk 322, and ECC code 402. Control then proceeds (at block 620) back to block 602 to process the next ith chunk 302 until all the chunks in the cache line are compressed. All the generated compressed chunk packages $400_1$ . . . $400_n$ for the cache line are then written (at block 622) to the cache memory cell array 202.

Described embodiments optimize zero-value compression by having an ensemble of data transformers encode input chunks or words of a cache line with mostly zeroes to produce transformed chunks, and then select a transformed chunk having a minimum number of non-zero values to optimize the zero-value compressor 318, which compresses by removing zero-values. Further, the data transformers $304_i$ transform the input chunk 302 in parallel on same clock cycles, so that the output having the minimum number of non-zero-values, i.e., most zero-values, is selected from transformed data from all the different transforms. In this way, the best transformed data is selected to compress, which may change for different input chunks words, on the same clock cycle.

Figure 7:
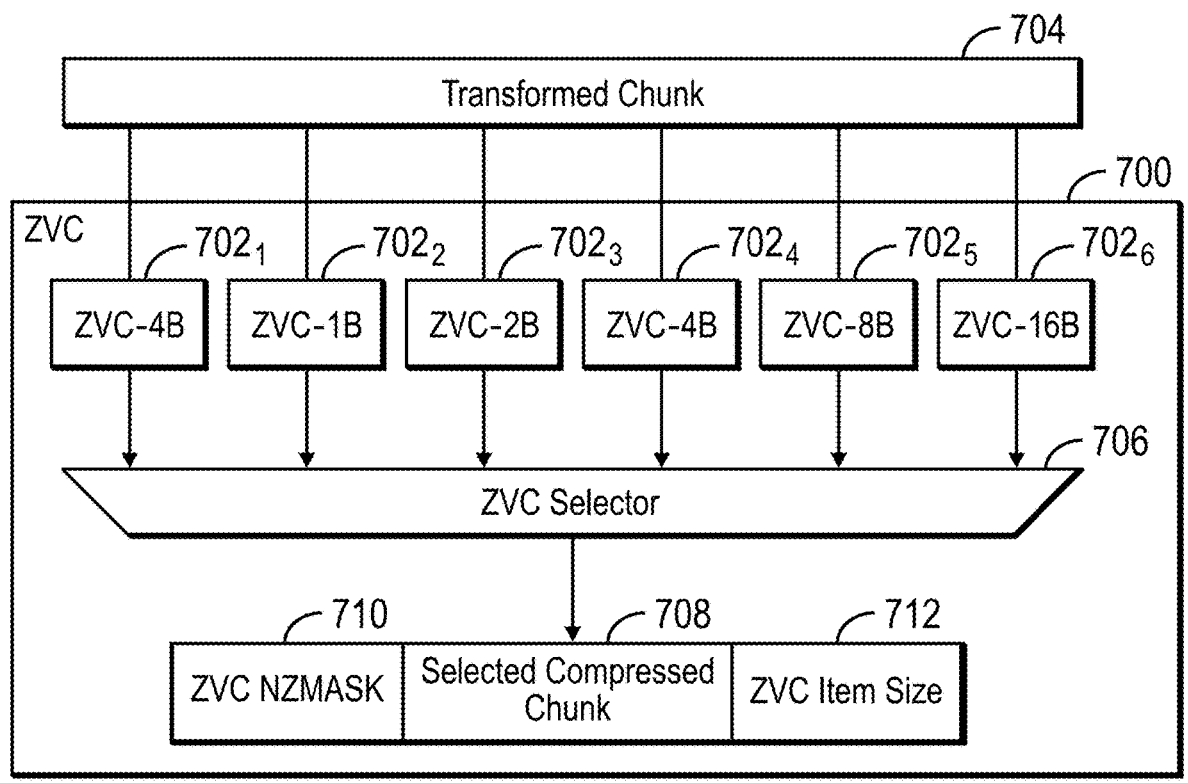
FIG. 7 illustrates an embodiment of an ensemble of zero-value compressors to use for the zero-value compressor in the compressor unit of FIG. 3.

FIG. 7 illustrates an embodiment where the zero-value compressor 318 in FIG. 3 is implemented as a zero-value compressor 700 having an ensemble of different zero-value compressors $702_1$, $702_2$, $702_3$, $702_4$, $702_5$, $702_6$ that each receive a transformed chunk 704, such as transformed chunk 316. Although six zero value compressors $702_i$ are shown there may be any number of multiple zero value compressors $702_i$. Each of the ZVC compressors $702_i$ may process data units of different item sizes, e.g., 4 bits and 1, 2, 4, 8, and 16 bytes, such that a data unit having a zero value, i.e., all zero bits, is removed. For instance, a data unit of a transformed chunk 316 may have a 1 byte data unit of a zero value, but that same 1 byte in a 2 byte data unit may have a non-zero value if there are non-zero bytes in the 2 byte data unit. Each ZVC $702_i$ outputs a compressed chunk and a non-zero mask indicating non-zero data units.

A ZVC selector 706 selects a compressed chunk 708 outputted by one of the ZVCs $702_i$ that has a minimum number of non-zero bits and outputs a non-zero mask (NZMASK) 710 indicating data units of the ZVC item size having non-zero values, and a ZVC item size 712 of the data units subject to zero-value compression. For instance, if the input chunk 302 is 32 bytes and the ZVC item size is 16 bytes, then the NZMASK 710 has two bits, one for each of the 16 byte data units in the compressed chunk 708. The non-zero bitmask 710, compressed chunk 708, and ZVC item size 712 may be sent to the packing logic 324 in FIG. 3 to be included in a compressed chunk package $400_i$ and written to the cache memory cell array 202.

Figure 8:
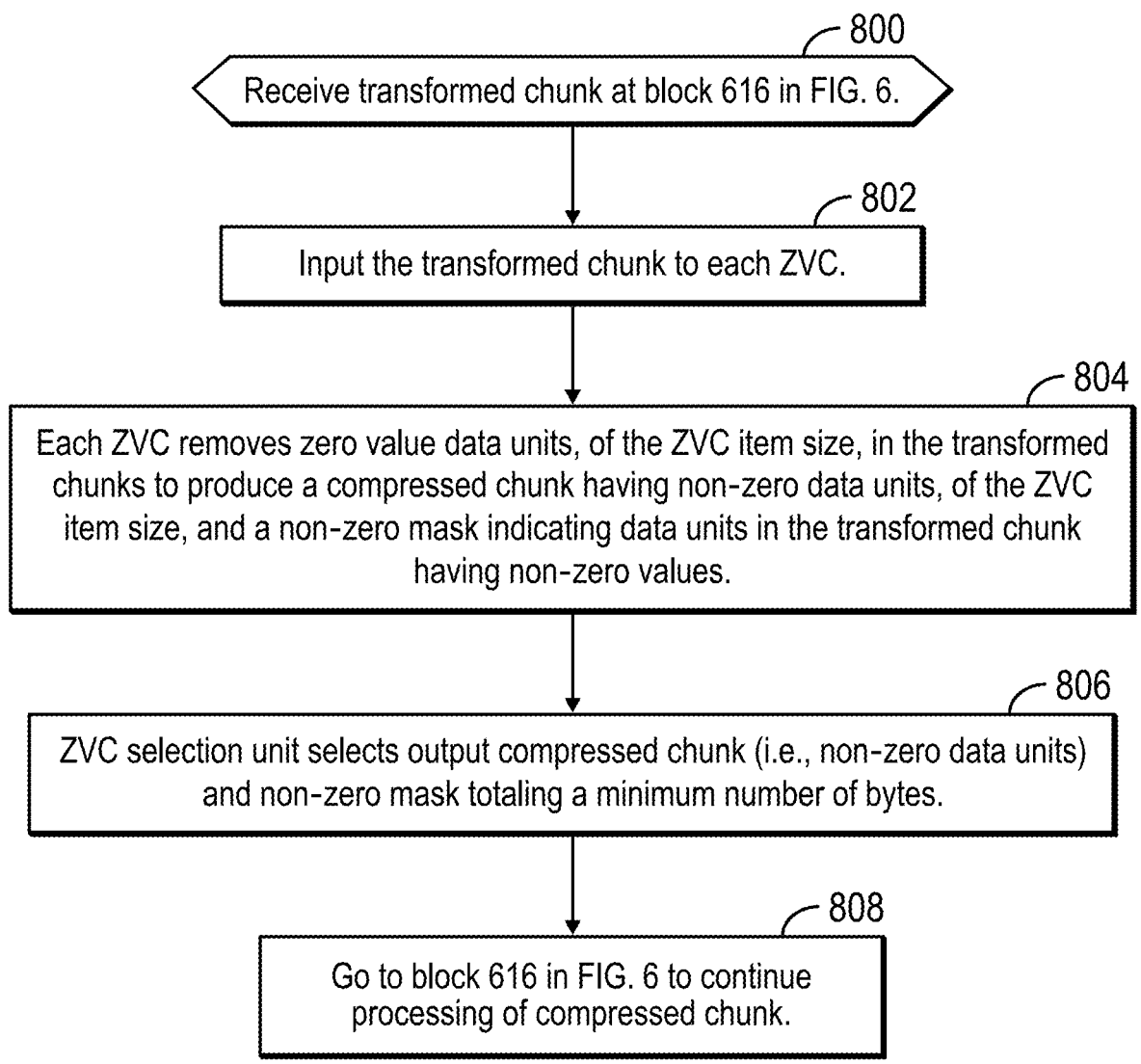
FIG. 8 illustrates an embodiment of operations to use the ensemble of zero-value compressors of FIG. 7 to compress data.

FIG. 8 illustrates an embodiment of operations performed by the ZVC 700 of FIG. 7 to select a compressed chunk 708 from an ensemble of ZVCs $702_i$ having the minimum number of non-zero bits to replace the operation in block 614 in FIG. 6. Upon receiving (at block 800) a transformed chunk 316, the transformed chunk 316 is inputted to each of the ZVCs $702_i$. Each ZVC $702_i$ removes (at block 804) zero value data units, of the ZVC item size for the ZVC $702_i$, in the transformed chunk 316 to produce a compressed chunk having only non-zero data units, of the ZVC item size, and a non-zero mask indicating data units, of the ZVC item size, in the transformed chunk having non-zero values. Each ZVC $702_i$ may remove chunks for data units of different item sizes. The ZVC selector 706 selects (at block 806) an output compressed chunk 708 (i.e., non-zero data units) and non-zero mask 710 for the compressed chunk 708 totaling a minimum number of bytes of the output compressed data and non-zero mask for all the ZVCs $702_i$. Control then proceeds (at block 808) to block 616 in FIG. 6 to continue processing of the compressed chunk 708.

With the embodiment of FIG. 8, an additional dimension of optimization is performed to have multiple ZVCs $702_i$ concurrently compress the transformed chunk for different size data units to determine the ZVC $702_i$ producing the compressed chunk 708 and non-zero bitmask 710 having a minimum number of bits to further optimize the compression to pick a best zero-value compression.

Figure 9:
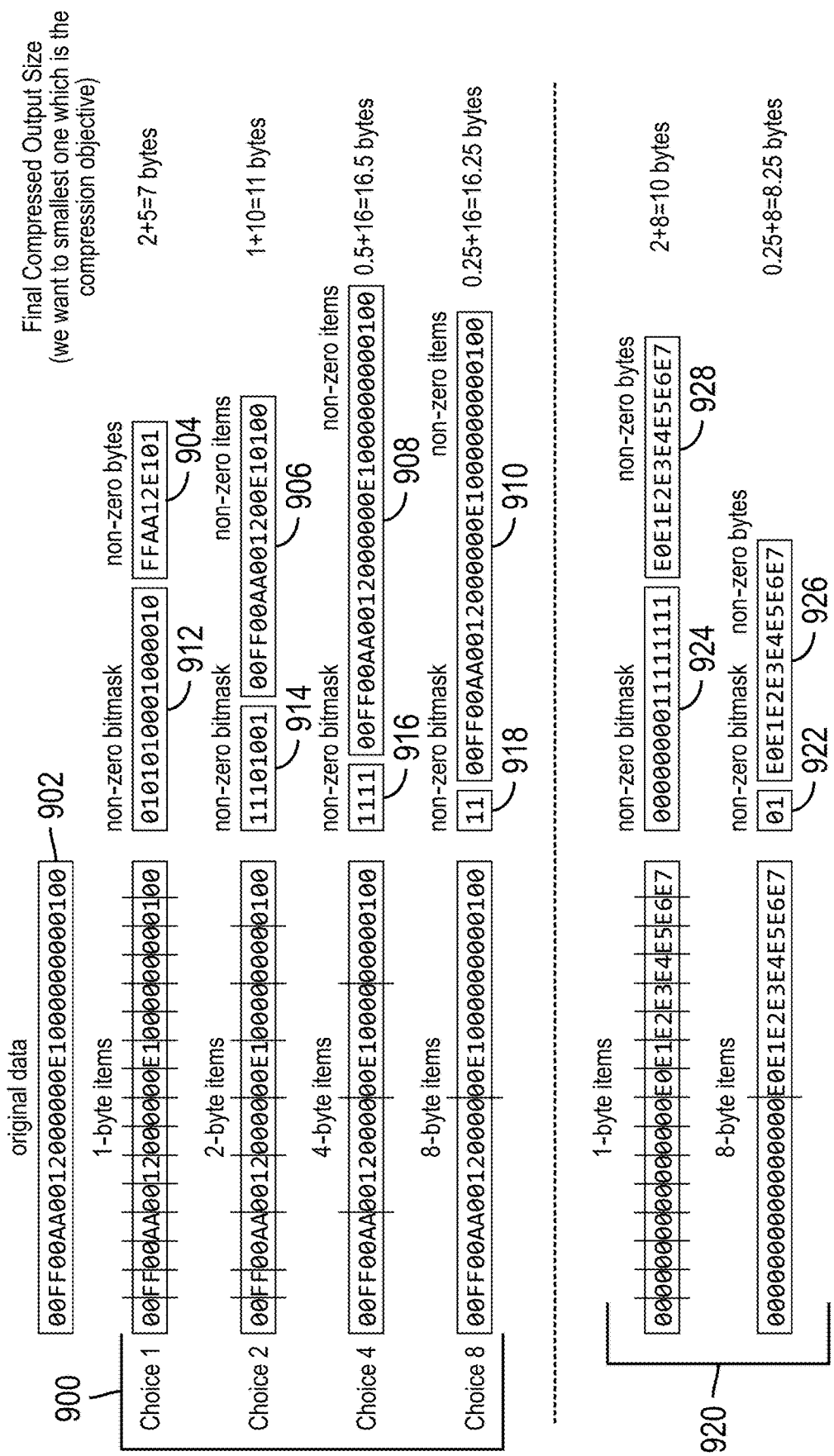
FIG. 9 illustrates a diagram of the result of compressing data with zero-value compressors having different item sizes of the data units removed for having zero values.

FIG. 9 illustrates how using different item sizes resulting in different size data units for the ZVCs $702_i$ produces different size non-zero bitmasks and non-zero values. Section 900 shows how different ZVC item sizes results in different compressed outputs for original data 902. For instances of the four choices 900 of different data unit item sizes of 1, 2, 4, and 8 bytes, the ZVC $702_i$ removing data units of a one-byte item size produces the smallest compressed chunk 904 of non-zero bits, as compared to non-zero items 906, 908, 910, but has the largest size non-zero bitmask 912 of non-zero bitmasks 914, 916, 918. However, the "choice 1" of a one-byte data unit size results in the compressed chunk 904 and non-zero bitmask 912 having the smallest number bytes of the other choices for 2, 4, and 8 byte item sizes of the data units. The second section 920 shows zero-value compression of 1 byte or 8 byte data unit item sizes. The 8 byte data unit size produces a non-zero bitmask 922 having significantly fewer bytes than non-zero bitmask 924 for the 1-byte item size, with compressed data 926 and 928, respectively, having a same number of bytes. Thus, for the initial original data shown in section 920, of the two options in section 920, a zero-value compressor removing 8 byte size zero-value data units results in better compression than using a 1-byte item size data unit, or 10 bytes versus 8.25 bytes.

In certain instances, the item size 504 selected for the data transformer method 304$_i$ may be different than the item size 506 selected for the zero-value compressor.

The letter designators, such as i, n, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A compression unit implemented in a cache memory having a cache memory cell array, comprising:
    a plurality of data transformers that each perform a transform on an input chunk to produce a transformed chunk having more zeroes than the input chunk;
    a selection unit to select a transformed chunk having a minimum number of non-zero bits;
    a zero-value compressor to process the selected transformed chunk to output a compressed chunk having all non-zeroes and fewer bits than the input chunk; and
    circuitry to store the compressed chunk in the cache memory cell array.

2. The compression unit of claim 1, wherein the selection unit selects one of a plurality of transformed chunks from the data transformers and the input chunk having a minimum number of non-zero bits, wherein selection of the input chunk inputs the input chunk to the zero-value compressor to output the compressed chunk.

3. The compression unit of claim 1, wherein each of the data transformers outputs a number of non-zero bits in the transformed chunk, further comprising:
    a population count unit to:
        receive the numbers of non-zero bits outputted by the data transformers; and
        indicate a data transformer producing the transformed chunk having a minimum number of non-zero bits; and
    a multiplexer to receive the indicated data transformer to select the transformed chunk from the indicated data transformer, wherein the multiplexer outputs the selected transformed chunk to the zero-value compressor.

4. The compression unit of claim 1, further comprising:
    circuitry for generating a header indicating an item size of data units on which a data transformer that produced the selected transformed chunk operates, wherein the header is stored with the compressed chunk in the cache memory cell array.

5. The compression unit of claim 1, further comprising:
    circuitry for generating a non-zero mask for each transformed chunk indicating data units of an item size used by each of the data transformers to produce each transformed chunk having non-zero-values, wherein the compressed chunk is stored in the cache memory cell array with the non-zero mask of the selected transformed chunk.

6. The compression unit of claim 1, wherein the selection unit comprises a first selection unit, wherein the zero-value compressor comprises:
    a plurality of zero-value compressors to remove zero-value data units for different item sizes of the selected transformed chunk, wherein each zero-value compressor of the plurality of zero-value compressors outputs a compressed chunk having non-zero data units of an item size operated on by the zero-value compressor and a non-zero bit mask indicating data units, of the item size of the zero-value compressor, in the transformed chunk that have non-zero values; and
    a second selection unit to select the compressed chunk from the zero-value compressors having a minimum number of non-zero bits.

7. The compression unit of claim 6, wherein the second selection unit selects the compressed chunk from a non-zero value compressor outputting a compressed chunk and non-zero bit mask having a minimum number of bytes.

8. The compression unit of claim 1, further comprising:
    circuitry to generate a header indicating a data transformer that produced the transformed chunk and the zero-value compressor that outputted the compressed chunk,
wherein the header is stored with the compressed chunk in the cache memory cell array.

9. The compression unit of claim 1, wherein the compression unit is included in a cache memory controller of the cache memory to compress data for a cache line in a cache implemented in the cache memory, wherein there are multiple input chunks to be compressed for each cache line.

10. The compression unit of claim 1, wherein the data transformers each comprise a plurality of different data transformers that operate in sequence on the input chunk.

11. The compression unit of claim 10, wherein the transform performed by each of the data transformers comprise a delta transform followed by an XOR transform and then followed by a bit plane transform.

12. A cache memory including:
    a cache memory cell array;
    a cache memory controller to manage read and write operations to the cache memory cell array; and
    a compression unit, comprising:
        a plurality of data transformers that each perform a transform on an input chunk to produce a transformed chunk having more zeroes than the input chunk;
        a selection unit to select a transformed chunk having a minimum number of non-zero bits;
        a zero-value compressor to process the selected transformed chunk to output a compressed chunk having all non-zeroes and fewer bits than the input chunk; and
        circuitry to store the compressed chunk in the cache memory cell array.

13. The cache memory of claim 12, wherein the compression unit further comprises:
    circuitry for generating a header indicating an item size of data units on which a data transformer that produced the selected transformed chunk operates, wherein the header is stored with the compressed chunk in the cache memory cell array.

14. The cache memory of claim 12, wherein the compression unit further comprises:
    circuitry for generating a non-zero mask for each transformed chunk indicating data units of an item size used by each of the data transformers to produce each transformed chunk having non-zero-values, wherein the compressed chunk is stored in the cache memory cell array with the non-zero mask of the selected transformed chunk.

15. The cache memory of claim 12, wherein the selection unit comprises a first selection unit, wherein the zero-value compressor comprises:
    a plurality of zero-value compressors to remove zero-value data units for different item sizes of the selected transformed chunk, wherein each zero-value compressor of the plurality of zero-value compressors outputs a compressed chunk having non-zero data units of an item size operated on by the zero-value compressor and a non-zero bit mask indicating data units, of the item size of the zero-value compressor, in the transformed chunk that have non-zero values; and
    a second selection unit to select the compressed chunk from the zero-value compressors having a minimum number of non-zero bits.

16. The cache memory of claim 15, wherein the second selection unit selects the compressed chunk from a non-zero value compressor outputting a compressed chunk and non-zero bit mask having a minimum number of bytes.

17. A method for compressing data in a cache memory, comprising:
    transforming an input chunk, by each of a plurality of data transformers, to produce a transformed chunk having more zeroes than the input chunk;
    selecting, by a selection unit, a transformed chunk having a minimum number of non-zero bits;
    processing, by a zero-value compressor, the selected transformed chunk to output a compressed chunk having all non-zeroes and fewer bits than the input chunk; and
    storing the compressed chunk in a cache memory cell array.

18. The method of claim 17, wherein the selection unit comprises a first selection unit, wherein the processing by the zero-value compressor comprises:
    removing, by a plurality of zero-value compressors, zero-value data units for different item sizes of the selected transformed chunk;
    outputting, by each zero-value compressor of the plurality of zero-value compressors, a compressed chunk having non-zero data units of an item size operated on by the zero-value compressor and a non-zero bit mask indicating data units, of the item size of the zero-value compressor, in the transformed chunk that have non-zero values; and
    selecting, by a second selection unit, the compressed chunk from the zero-value compressors having a minimum number of non-zero bits.

19. The method of claim 17, further comprising:
    generating a header indicating an item size of data units on which a data transformer that produced the selected transformed chunk operates, wherein the header is stored with the compressed chunk in the cache memory cell array.

20. The method of claim 17, further comprising:
    generating a non-zero mask for each transformed chunk indicating data units of an item size used by each of the data transformers to produce each transformed chunk having non-zero-values, wherein the compressed chunk is stored in the cache memory cell array with the non-zero mask of the selected transformed chunk.

* * * * *